B. G. BRAINE.
INSULATOR FOR RAIL JOINTS.
APPLICATION FILED JULY 20, 1912.
1,048,646.
Patented Dec. 31, 1912.
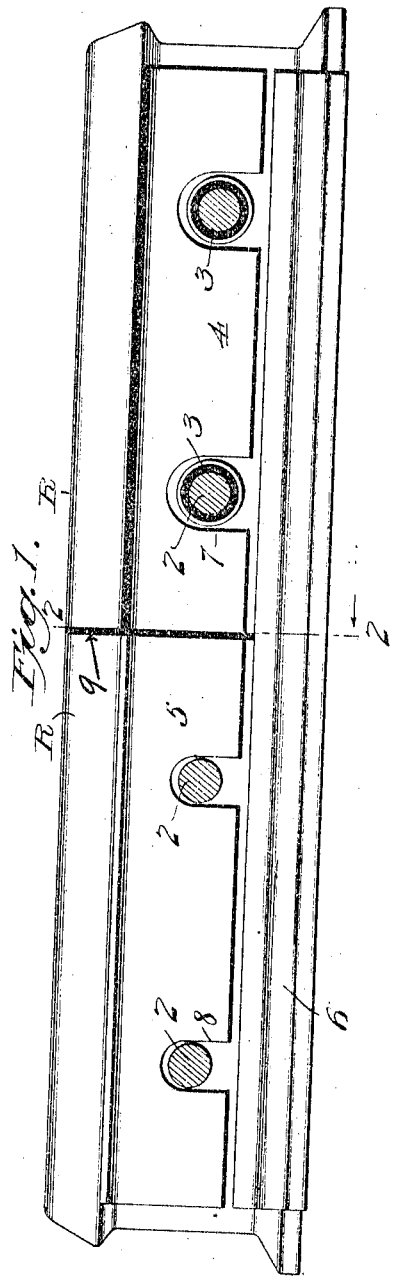
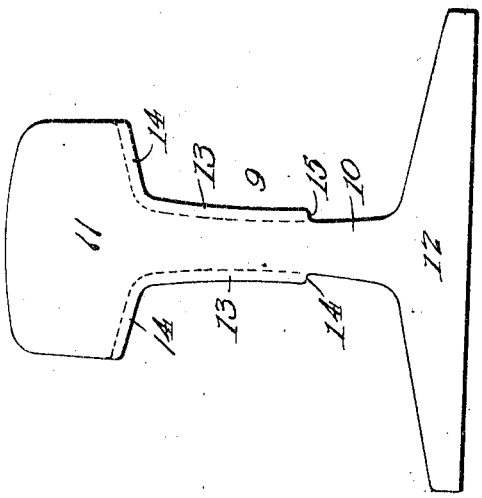
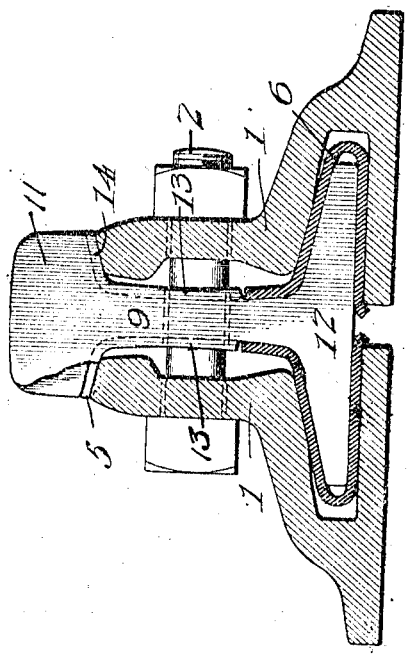
Witnesses
Inventor
Bancroft G. Braine
By
Attorney

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

INSULATOR FOR RAIL-JOINTS.

1,048,646.  Specification of Letters Patent.  Patented Dec. 31, 1912.

Application filed July 20, 1912. Serial No. 710,717.

*To all whom it may concern:*

Be it known that I, BANCROFT G. BRAINE, a citizen of the United States, residing at New York, in the county of New York and State of New York, have invented certain new and useful Improvements in Insulators for Rail-Joints, of which the following is a specification.

This invention relates to means for insulating rail joints and more particularly of the "divided-fiber" type wherein the insulation is in two parts, respectively for the head and base flange portions of the rails, and wherein the different pieces of insulation are separately removable and replaceable.

To this end, the invention primarily has in view a novel form of insulator which is utilized as the end post insulation of the joint, and combines with the separate pieces of insulation and metal fillers in such a manner as to more effectually secure and maintain more perfect insulating conditions throughout the joint, by preventing break down of the electric circuits arising from the metal parts creeping or moving into contact.

With these and many other objects in view which will more readily appear as the details of the invention are fully understood, the same consists in the novel construction, combination and arrangement of parts hereinafter more fully described, illustrated, and claimed.

Though adaptable for use with the various modifications of the "divided-fiber" type of insulated rail joint, a preferred and practical embodiment of the present invention is shown in the accompanying drawings, in which—

Figure 1 is a side elevation of a divided-fiber rail joint, embodying the present invention, and showing the joint bar removed to expose the sections of insulation and the metal filler at that side, the novel form of insulating end post acting as the electrical insulator therebetween. Fig. 2 is a cross sectional view of the joint on the line 2—2 of Fig. 1. Fig. 3 is an enlarged plan view of the improved insulating end post.

Like references designate corresponding parts in the several figures of the drawings.

As indicated, the improved insulator, or insulating end post, is particularly designed for application to insulated rail joints of the divided-fiber type, but possesses special utility as a unit of the insulation embodied in a divided-fiber rail joint having a modified one-end insulation, wherein insulating material is only applied to one rail end beneath the head thereof, and other insulation is applied to the flanges of both rail ends and acts as a base insulation for the joint throughout. In this form of joint, the rail end that is not provided with insulation beneath the head thereof is fitted with compensating filler pieces. Accordingly, a joint of this kind embodies in its organization the rails R, R, the side joint bars 1—1, and the usual joint bolts 2, with which bolts are associated any of the approved or well known forms of bolt insulation, as indicated by the reference numeral 3 in Fig. 1 of the drawings. The illustrated type of rail joint referred to also includes an upper or head section of insulation 4 arranged at each side of one of the rail ends, an upper detachable metal filler piece 5 arranged at each side of the other rail end, and a base section of insulation 6 arranged at each side of the joint and fitting the base flanges of both rails, said section of insulation extending the full length of the joint.

Each head section of insulation 4 for one rail end is made of the usual fiber sheet or of other insulating material and is usually formed with vertically arranged keeper notches 7 which are loosely interlocked with the joint bolts to assist in properly holding the same in place. The metal filler pieces 5 for the other rail end are substantially the same in dimensions, and construction as the sections of insulation 4, and are likewise usually provided with keeper notches 8 that loosely interlock with the joint bolts.

To complete the insulation of the joint, the improved insulator or insulating end post, designated by the numeral 9, is placed between the rail ends. Ordinarily the insulating end post for insulated rail joints is of the exact cross sectional area and contour of the adjoining rail ends, but according to the present invention, the end post 9 is of modified design or contour. That is to say, the said end post not only includes the usual web member 10, the head piece 11 at the upper end of the web member and the flange base member 12 at the lower end of the web member, but also is formed with laterally projecting side extension flanges 13 and downwardly projecting head extension flanges 14. The laterally projecting side extension flanges 13 increase the normal width of the vertical web member 10 of the post, and therefore project into the interval or space between the web portions of the adjacent filler pieces 4 and 5, and thus interpose an insulating separator at these points which prevents movement of the said filler pieces in a direction that would interfere with or disturb the insulating functions of the joint.

The downwardly projecting head extension flanges 14 are extensions of the under side of the head piece 11 of the end post body, and project into the space between the flanges at the upper edges of the filler pieces 4 and 5, thereby combining with the side extension flanges 13 to assist in preserving the insulating functions of the joint, particularly where metal fillers 5 are employed, so that the latter are prevented from coming in contact with the insulated rail end.

The laterally projecting side extension flanges 13 of the end post body do not extend the full height of the vertical web member thereof. As shown, these side extension flanges terminate in check shoulders 15 disposed a distance above the flanged base member 12 of the post and which overlie the upper edge of the base section of insulation 6. This construction provides means for more securely and satisfactorily holding the end post within the joint in its proper operative relation to the rail ends and to the filler pieces 4 and 5.

The term "filler piece" as employed herein has been intended to apply to either the insulation or metal plates, as the improved insulator or insulating end post is designed for application to any and all forms of insulated rail joints embodying the divided-fiber insulation.

I claim:—

1. An insulating end post for rail joints comprising a body of insulating material having extension flanges disposed at the under sides of its head piece and along the edges of its web member for a portion of the length of the latter, said extension flanges lying wholly inside of the plane of the side edges of the head piece of the body.

2. The combination with an insulated rail joint having separate upper and lower sections of insulation and corresponding metal fillers, of an insulating end post comprising a body of insulating material having its head piece and flange base member of substantially the dimensional area and shape of the corresponding portions of the rail ends, said body being further provided with extension flanges disposed at the under sides of the said head piece and extending along the edges of the web member for a portion of the length of the latter and terminating short of said flange base member of the end post body.

3. In an insulated rail joint, the rails, joint bars, separate filler pieces applied to the rails above the joint bolts, base sections of insulation applied to the rails below the joint bolts, and an insulating end post provided at opposite edges with extension flanges projecting between and separating the ends of adjoining fillers, said extension flanges terminating in check shoulders overlying the lower sections of insulation.

In testimony whereof I hereunto affix my signature in the presence of two witnesses.

BANCROFT G. BRAINE.

Witnesses:
E. F. SCHERMERHORN,
E. K. KERSHNER.